Figure 9:
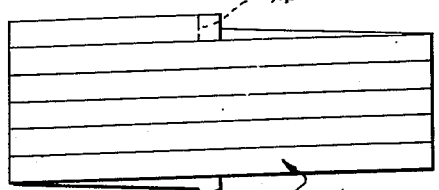

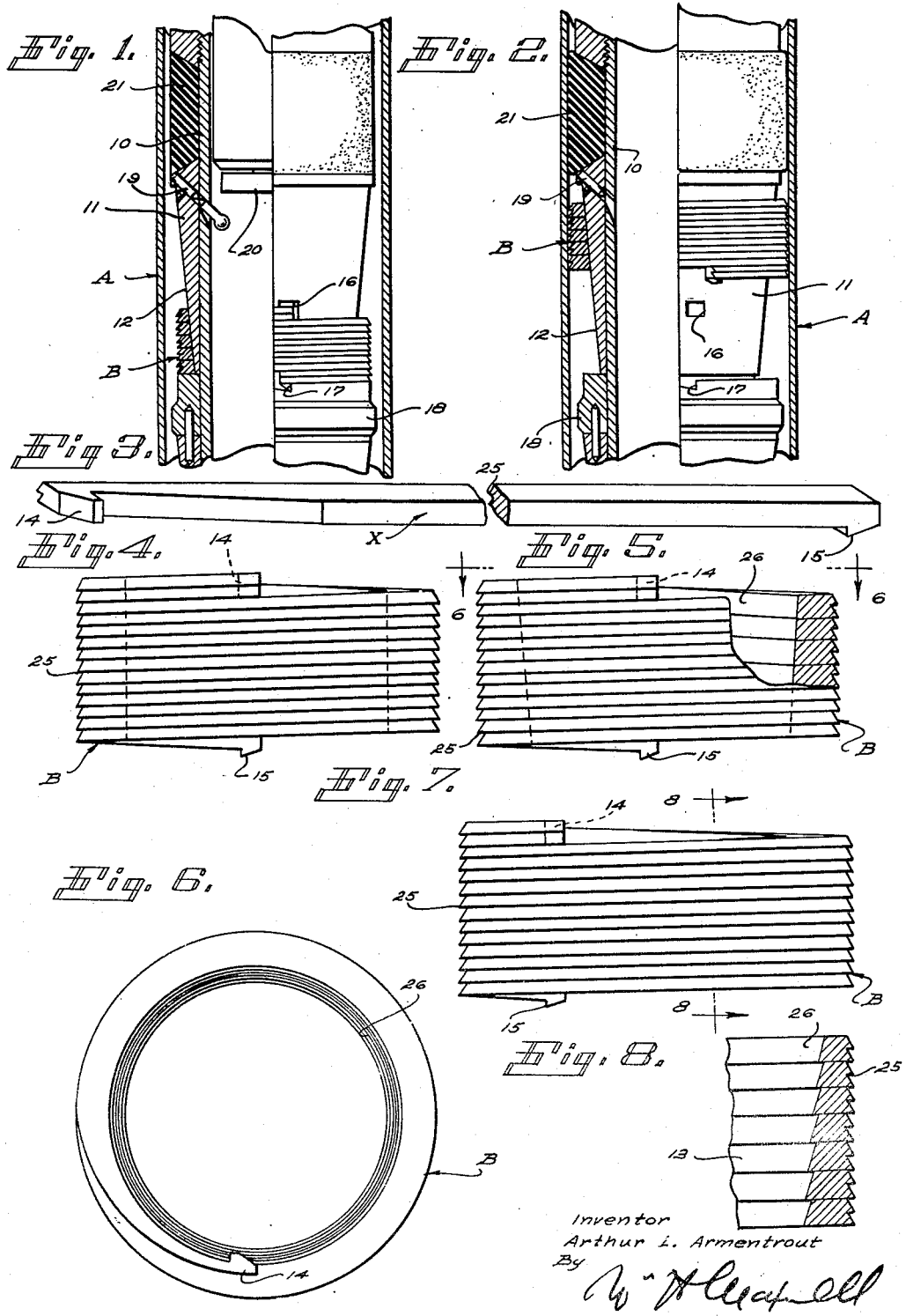

March 2, 1954     A. L. ARMENTROUT     2,670,797
GRIPPER

Filed Oct. 7, 1948                                 2 Sheets-Sheet 2

Inventor
Arthur L. Armentrout
By
Attorney

Patented Mar. 2, 1954

2,670,797

UNITED STATES PATENT OFFICE 2,670,797

GRIPPER

Arthur L. Armentrout, Long Beach, Calif.

Application October 7, 1948, Serial No. 53,338

6 Claims. (Cl. 166—12)

This invention has to do with a gripper, it being a general object of the invention to provide a gripper or gripping element for incorporation in structures such as slips, plugs, hangers, and like equipment such, for example, as are commonly employed in handling tubular materials or elements.

It is a general object of the invention to provide a gripper that is particularly effective, which is simple in form and construction, and which is dependable and also to provide a method by which such gripper can be made accurately and economically.

There are various situations in which grippers or gripping elements are employed to act between relatively movable elements, as for instance, a tubular shell and an internal wedge or conical expander. The gripper provided by the present invention is particularly practical as applied to oil well equipment wherein grippers or gripping devices are commonly employed in slips, plugs, hangers and other like devices and therefore I will, in the following disclosure, set forth forms of the invention particularly practical as applied to equipment for use on or in wells, and will describe the gripper in connection with parts applicable to wells; it being understood that such specific reference is given primarily for purpose of illustration and is not to be construed in any way as a limitation or restriction upon the broader aspects of the invention.

A general object of this invention is to provide a gripper to be engaged in a tubular part such as a well casing, or the like, and which involves one continuous body with teeth on the exterior thereof, which body is spirally formed and normally tends to assume a position causing it to tightly engage in the tubular part.

Another object of this invention is to provide a gripper of the general character referred to having included or provided thereon features or elements such as anchoring parts or holders by which the gripper may be held inoperative or in a position where it is contracted to a diameter smaller than the tubular part in which it is to operate.

A further object of the invention is to provide a gripper of the general character referred to having combined therewith a supplemental element such as a filler which may be of such character as to act as a packing or which may be hard enough to have value as a gripping element while at the same time it is soft enough to be drillable through the medium of a drilling tool such as a well bit, or the like in the event that its removal is desired.

Another object of the invention is to provide a method of providing or forming a gripper of the general character hereinabove referred to by which the gripper, though of complicated shape or form, may be easily and economically manufactured.

Figure 10:
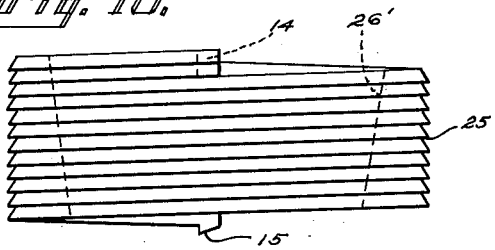
Figure 11:
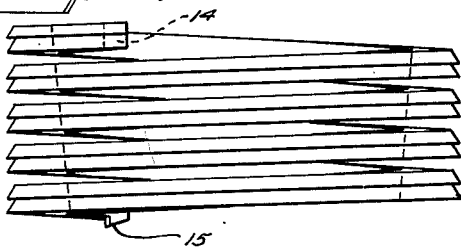
Figure 15:
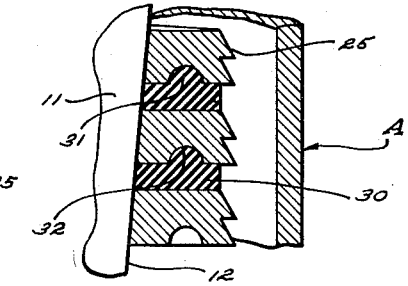
Figure 12:
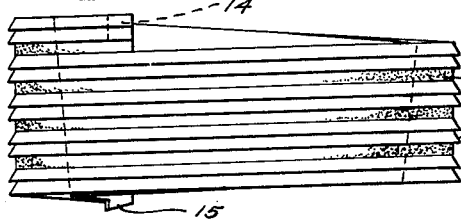
Figure 16:
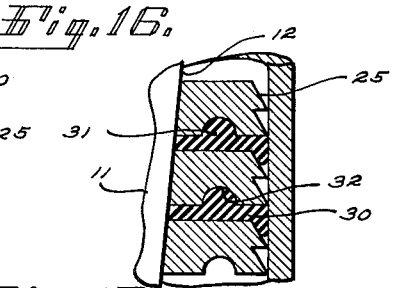
Figure 13:
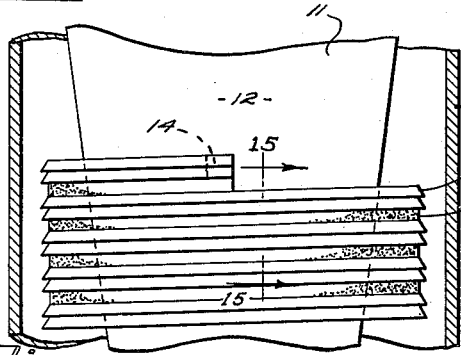
Figure 17:
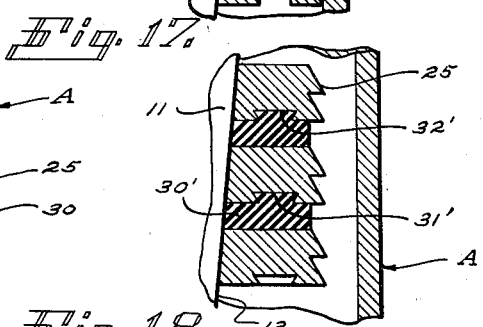
Figure 14:
Figure 18:
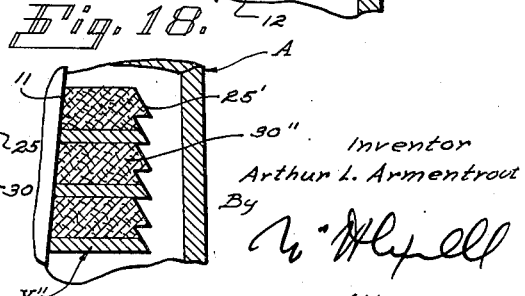

The various objects and features of my invention will be fully understood from the following detailed description of typical preferred forms of apparatus and typical manners of carrying out the method of my invention, throughout which description reference is made to the accompanying drawings, in which:

Fig. 1 is a view showing the principal parts of a liner hanger located in a well casing, the hanger including a gripper embodying the present invention, parts of the structure being shown in section to illustrate details of formation and arrangement, the liner hanger being shown unactuated, in which case the gripper is contracted and confined to the small end of the operating wedge included in the hanger. Fig. 2 is a view similar to Fig. 1, showing the hanger actuated, in which case the gripper is expanded and is at the large end of the wedge included in the hanger; the liner to which the hanger is attached having been lowered so the hanger is fully set. Fig. 3 is a perspective view of the body employed in the formation of the gripper after initial fashioning operations have been performed thereon, enough to establish the end portions with anchoring means or holders, and with gripping teeth on one side or edge thereof. Fig. 4 is a view illustrating the body shown in Fig. 3 coiled or wrapped into helical form with the gripping teeth on its exterior and so that its outside diameter is substantially the same as the tubular part in which the gripper is to engage. Fig. 5 is a view similar to Fig. 4 showing the interior of the structure finished or fashioned to fit a wedge, a part of the structure being broken away to illustrate the shape to which the interior is finished. Fig. 6 is an end view of the structure shown in Fig. 5, being a view taken as indicated by line 6—6 on Fig. 5. Fig. 7 is a view similar to Fig. 5 showing the gripper deformed to be larger than it is in Fig. 5, in which case it will not fit into or enter the element in which it is to be engaged. Fig. 8 is an enlarged detailed sectional view taken as indicated by line 8—8 on Fig. 7. Fig. 9 is a view similar to Fig. 4 showing a somewhat different manner of carrying out the invention in which case the body as initially wrapped into helical or spiral form is without teeth. Fig. 10 is a view of the structure shown in Fig. 5 after the teeth have been provided on the exterior thereof and after the interior has been finished. Fig. 11 is a view illustrating the manner in which a body such as appears in Fig. 5 or a body such as is shown in Fig. 10 may be expanded axially, as well as radially, so that it is enlarged as to length and also as to diameter, establishing a space between adjacent convolutions. Fig. 12 is a view illustrating a supplemental material such as a soft material between adjacent convolutions of the body. Fig. 13 is a view similar to Fig. 12 showing the body, the supplemental material between the convolutions thereof and contracted from the position that the body normally tends to assume to be confined on the small end of a wedge and to a member in which the body is designed to engage. Fig. 14 is a view similar to Fig. 13, showing the body expanded to engage in the member in which it is to expand and showing it at the large end of the wedge. Fig. 15 is an enlarged detailed sectional view taken as indicated by line 15—15 on Fig. 13. Fig. 16 is a view similar to Fig. 15, being a view taken as indicated by line 16—16 on Fig. 14. Fig. 17 is a view similar to Fig. 15 showing a modified construction, and Fig. 18 is a view similar to Figs. 15 and 17 showing a further form of construction.

The gripper of the present invention being particularly practical as applied to well tools, is shown as the gripping element of a liner hanger and the particular liner hanger illustrated is of the form and construction which is more fully described and claimed in my copending application entitled "Liner Hanger and Actuator Therefor," filed on September 30, 1948, Serial No. 52,037.

In the drawings the liner hanger is shown arranged in a tubular element which may be considered a well casing A and the hanger involves, generally, a tubular body 10 carrying a tapered sleeve 11 which is in the nature of a wedge, the outer surface 12 thereof being tapered to have the desired wedging action. The gripper B provided by the present invention is employed in the hanger to operate on or over the wedge 11 from the small end thereof, as shown in Fig. 1, to the large end thereof, as shown in Fig. 2.

In its general formation the gripper B is a spirally wound or helically formed body normally tending to expand to a size somewhat larger than the internal diameter of the casing A. The gripper is provided with holding or fastening means by which it may be releasably held in a contracted position where it is smaller in diameter than the casing A to fit therein with clearance, as shown in Fig. 1. In the particular case illustrated holding lugs 14 and 15 are provided at the ends of the spirally wrapped member forming the gripper. The holding lug 14 at the upper end of the gripper is adapted to latch or engage in a socket opening 16 in the wedge while the lug 15 at the lower end of the gripper is adapted to engage or hook onto a shoulder 17 provided on a ring 18 held on the exterior of the body 10. When this construction is employed the wedge 11 is rotatably supported on the body 10 and a shear pin 19 is provided to releasably hold the wedge on the body with the gripper positioned as shown in Fig. 1. When the shear pin is broken as by an actuator 20 engaged in the body the wedge is free to move relative to the body freeing the gripper so that it assumes a position where it operatively engages the casing A as shown in Fig. 2.

In the particular hanger illustrated a packing sleeve 21 is engaged around the body 10 above the wedge and the wedge is shiftable axially on the body to a position where it causes the packing sleeve 21 to be compressed so that it has sealing engagement with the casing, as shown in Fig. 2.

It is believed that the nature of the gripper as provided by the present invention will be best understood from a detailed description of the method by which it is made, it being understood that the particular method about to be described is for the making of a gripper of the particular form or type above referred to and that in practice variations may occur in the method as details of the gripper are modified.

In accordance with the first general step of the method of producing the gripper an elongate body X of suitable material is initially acted upon or fashioned to provide features that are most advantageously established at this point in the method of making. For example, it is desirable to initially establish the anchoring lugs 14 and 15 at the ends or on the end portions of the body or strip of material, as such parts can be readily cut or shaped on the body at this time by employing a simple, inexpensive and ordinary forming tools or methods. Further, in the particular form of the invention illustrated on sheet 1 of the drawings the elongate strip or body X is initially provided on one side or edge with gripping teeth 25. In the particular case illustrated the teeth are formed to extend longitudinally of the body or continuously thereof from one end to the other and they are fashioned like the teeth of slips so that they face in one direction axially of the gripper to be highly effective in gripping to resist movement of the gripper in one direction axially in the casing A.

The body or strip X employed in the gripper is preferably of steel, or like material, and when of steel it is in a soft or annealed form when initially acted upon and as formed, as will be hereinafter described. In practice it is desirable to form the gripper of steel such as is commonly employed in the manufactre of springs, or the like.

When the elongate body or strip X has been preliminarily fashioned or provided with features such as the lugs 14 and 15 desirable in the finished product it is spirally formed or wrapped into a helix as shown in Fig. 4 of the drawings, it being preferred that it be initially formed into a coil the outside diameter of which is substantially that of the inside diameter of the casing A in which the gripper is to engage. Such a spirally formed strip is shown in Fig. 4 of the drawings.

The spirally formed strip, as shown in Fig. 4, is next tapered on the inside, that is, it is finished as by boring, grinding, or other suitable fashioning steps so that its inner surface or bore 26 is tapered from one end of the gripper to the other at an angle corresponding to the taper of the exterior 12 of the wedge 11, the bore 26 being preferably made such as to accurately fit or receive the large end of the wedge, as shown in Fig. 2 of the drawings.

Following the tapering of the inside of the gripper the helically formed body is deformed somewhat so that it remains in helical form but is somewhat larger in diameter than the casing A in which the gripper is to operate, the deformed helical body being shown in Fig. 7 of the drawings.

The expanded or deformed helical strip or body having teeth on its exterior and having its exterior and interior shaped in the desired manner and having features incorporated in it such as the lugs 14 and 15, is next heat treated to give it the characteristics of a spring, it being preferred to so heat treat it as to make it highly resilient, in which case it normally yieldingly tends to return to the shape or size shown in Fig. 7 upon being forced therefrom in either direction in any manner.

In employing the heat treated or highly resilient helical gripper formed as above described it may be initially applied to an unactuated liner hanger such as is shown in Fig. 1, in which case its ends are held between the ring 13 and the wedge held by the shear pin so that it is contracted at the small end of the wedge and is consequently clear of the casing A. Upon release of the shear pin 19 the wedge 11 is released so that it is free to turn as well as move axially relative to the body 10, with the result that the gripper is free to expand toward the position shown in Fig. 7 until it firmly seats in the casing A. It will be apparent how the gripper engaged in the casing may be tightly seated in that position by engagement of the large end of the wedge within the bore of the gripper. In most cases the wedge and body 10 will move down in the gripper to set it. With the bore of the gripper accurately shaped or finished in the manner above described the wedge is most effective in fitting in the gripper, assuring accurate uniform gripping action of the gripper with the casing.

In accordance with the broader principles of the present invention the outside, as well as the inside, of the spirally wound body X' may be finished after the strip or length of material has been initially formed into the helix. In Fig. 9 the body X' is shown wrapped after only its end portions have been worked upon to establish the lugs 14 and 15. With the body initially shaped into the spiral the teeth are formed on the exterior thereof and the bore 26' is finished, as shown in Fig. 10.

In the form of the invention illustrated in Figs. 11 to 16, inclusive, the spirally wound resilient gripper body formed by either of the manners above described is taken before the heat treating step and is expanded axially so that adjacent convolutions are spaced somewhat apart as clearly shown in Fig. 11 of the drawings. The helical body thus expanded radially as well as axially is then heat treated so that it is highly resilient.

In accordance with the present invention a supplemental filler 30 of material softer than the body is then applied between adjacent convolutions and may, if desired, be one continuous strip of material corresponding in length with the helical resilient body of the gripper so as to extend continuously from one end to the other of the gripper fully occupying the space between convolutions formed by the axial deformation that preceded heat treatment. The supplemental material 30 may, as shown in Figs. 12 to 16, inclusive, be so soft as to act primarily as a packing material, in which case it may act to seal against the exterior of the wedge and also squeeze out somewhat from between the convolutions of the body to have sealing engagement with the inner wall of the casing A, as shown in Figs. 14 and 16 of the drawings.

When a body of supplemental material 30 is employed, as above described, it is preferred that it be retained or anchored in the resilient body as for example a retaining rib 31 may be provided on one side of the supplemental strip to enter a receiving groove 32 in the body in the manner clearly shown in Figs. 15 and 16 of the drawings.

In Fig. 17 of the drawings a somewhat modified form of holding means is provided for holding the strip of supplemental material 30'. In this case a dove-tailed fit or engagement is provided between the retaining rib 31' and its holding groove 32'.

In accordance with the present invention the supplemental material to be used in connection with the helically formed resilient body of spring steel, or the like, may be considerably harder than a material suitable for packing. For instance, it may be hard enough to have some value as a gripping element, while at the same time it is soft enough to be readily drilled out by ordinary drilling equipment such as an ordinary well drilling bit. Such a situation is illustrated in Fig. 18 of the drawings where the body X'' of spring steel, fashioned in accordance with the method above described, is made as thin or as light as is consistant with reasonable strength, firmness and rigidity while the supplemental body 30'' is considerably thicker than the resilient body and is formed of a material such as hard pressed fiber, or the like, which has considerable strength and effectiveness as a holding medium and will effectively support gripping teeth 25'.

A structure of the character just described will act in connection with a casing or in connection with a casing and an expanding element such as a wedge and yet it is fragile enough so that it can be easily destroyed by ordinary drilling methods, the supplemental body 30'' being definitely drillable while the spring steel body X'' is so light or frail as to be readily broken up in the course of ordinary drilling.

When I employ the term "drillable" as applied to the supplemental material employed in connection with the helical spring gripper I mean to include any material or combination of materials of such character or degree of softness as to be effectively broken up, destroyed, or disintegrated through the action of a well drilling bit or the like.

Having described only typical preferred forms and applications of my invention and only typical manners of carrying out the method of my invention, I do not wish to be limited or restricted to the specific details herein set forth, but wish to reserve to myself any variations or modifications that may appear to those skilled in the art and fall within the scope of the following claims:

Having described my invention, I claim:

1. A liner hanger operable to carry a well liner in a casing including, a tubular body adapted to carry the liner, a helical casing gripper surrounding the body and having one end anchored to the body against movement around the body, a conical wedge surrounding the body, the wedge being arranged within the gripper, means anchoring the other end of the gripper to the wedge, the wedge being rotatable on the body to a position where the gripper is contracted, and means releasably holding the wedge in said position.

2. A liner hanger operable in a casing and including, a tubular liner carrying body, a helical casing gripper around the body having one end anchored against movement around the body, a conical wedge surrounding the body and engaged within the gripper and holding the other end of the gripper and rotatable around the body to a position where the gripper is contracted and clear of the casing, and a shear pin releasably holding the wedge in said contracted position.

3. A liner hanger operable in a casing and including, a tubular liner carrying body, a helical casing gripper around the body having one end anchored against movement around the body, a conical wedge surrounding the body and surrounded by the gripper and holding the other end of the gripper, the wedge being rotatable on the body to a position where the gripper is contracted, and means releasably holding the wedge in said position, the gripper including a strip of resilient material normally expanded relative to the body.

4. A liner hanger including, a tubular body, a packer on the body, a helical resilient gripper around the body and normally expanded relative to the body and having one end anchored against movement around the body, a conical wedge engaged in the gripper holding the other end of the gripper and shiftable longitudinally on the body to actuate the packer and rotatable on the body to contract the gripper, and means releasably holding the wedge unactuated relative to the packer and with the gripper contracted.

5. A liner hanger including, a tubular body, a packer on the body, a helical resilient gripper around the body and normally expanded relative to the body and having one end anchored against movement around the body, a conical wedge within the gripper holding the other end of the gripper and shiftable longitudinally on the body to actuate the packer and rotatable relative to the body to contract the gripper, and a shear pin releasably holding the wedge unactuated relative to the packer and with the gripper contracted.

6. A liner hanger including, a tubular body, a helical gripper around the body having one end anchored against movement around the body, a conical wedge on the body and within the gripper and holding the other end of the gripper and rotatable relative to the body to a position where the gripper is contracted, and a shear pin releasably holding the wedge in said position, the shear pin having a head exposed at the interior of the body.

ARTHUR L. ARMENTROUT.

References Cited in the file of this patent

UNITED STATES PATENTS

| Number | Name | Date |
|---|---|---|
| 323,446 | Richards | Aug. 14, 1885 |
| 1,357,958 | Crowell | Nov. 9, 1920 |
| 1,407,570 | Peirce | Feb. 21, 1922 |
| 1,926,017 | Wells | Sept. 5, 1933 |
| 1,935,147 | Drexler | Nov. 14, 1933 |
| 2,155,380 | Bean | Apr. 25, 1939 |
| 2,174,076 | Bowen | Sept. 26, 1939 |
| 2,184,634 | Crickmer et al. | Dec. 26, 1939 |
| 2,204,659 | Burt | June 18, 1940 |
| 2,257,987 | Starkey | Oct. 7, 1941 |
| 2,264,480 | Owen | Dec. 2, 1941 |
| 2,329,286 | Meyer | Sept. 14, 1943 |
| 2,359,900 | Endsley | Oct. 10, 1944 |
| 2,474,491 | Penick | June 28, 1949 |
| 2,480,783 | Sloan | Aug. 30, 1949 |

FOREIGN PATENTS

| Number | Country | Date |
|---|---|---|
| 211,983 | Switzerland | Oct. 13, 1940 |